Figure 1:
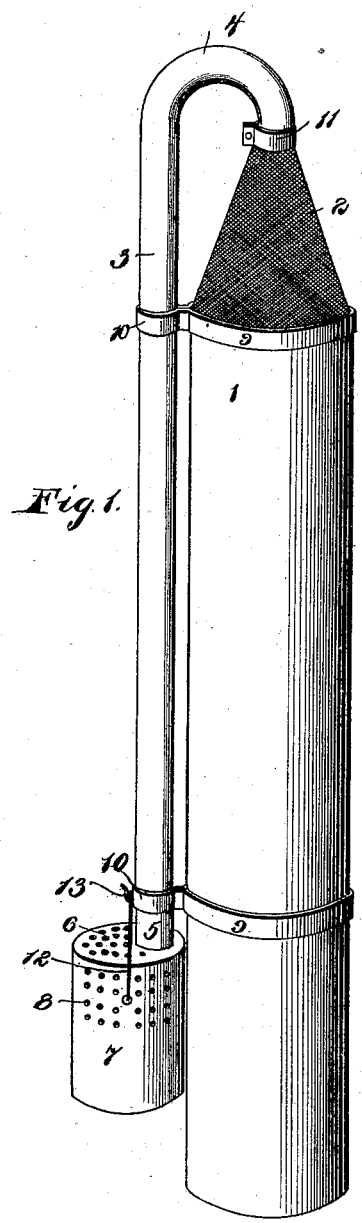

(No Model.)

J. W. TROUTT.
SPARK ARRESTER.

No. 605,363.  Patented June 7, 1898.

Witnesses
C. Bradway.
AW Poynton

Inventor
James W. Troutt.
By John Hedderburn
Attorney

UNITED STATES PATENT OFFICE.

JAMES W. TROUTT, OF ELKTON, KENTUCKY.

SPARK-ARRESTER.

SPECIFICATION forming part of Letters Patent No. 605,363, dated June 7, 1898.

Application filed April 2, 1897. Serial No. 630,363. (No model.)

*To all whom it may concern:*

Be it known that I, JAMES W. TROUTT, a citizen of the United States, residing at Elkton, in the county of Todd and State of Kentucky, have invented certain new and useful Improvements in Spark-Arresters; and I do hereby declare the following to be a full, clear, and exact description of the invention, such as will enable others skilled in the art to which it appertains to make and use the same.

This invention relates to spark-arresters, having for its object to provide, in connection with the smoke-stack of either a stationary, locomotive, or marine engine, a simple and efficient device for preventing live sparks from being ejected from the stack with sufficient force to carry the same to distant points, thus endangering life and property.

The improved spark-arrester is designed to conduct the sparks to a suitable cup or receptacle in which is placed a quantity of water, the sparks being submerged therein and extinguished.

To this end the invention consists in an improved spark-arrester embodying certain novel features and details of construction and arrangement of parts, as hereinafter fully described, illustrated in the drawings, and pointed out in the claim hereto appended.

Figure 2:
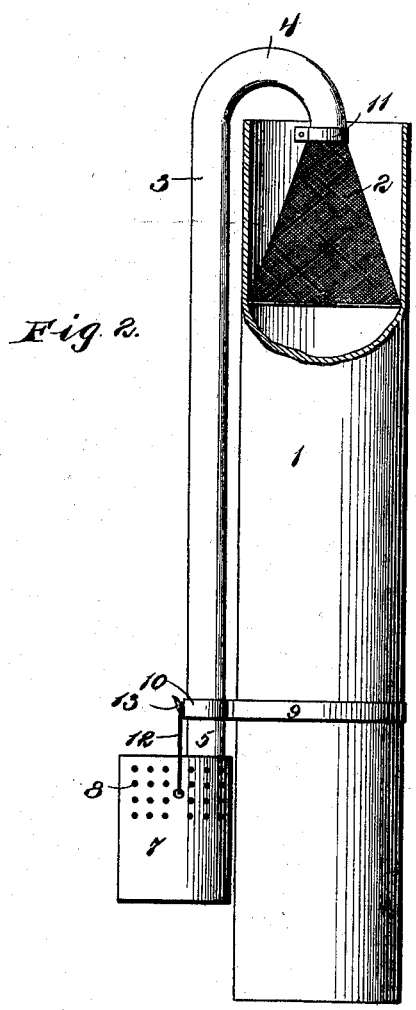

In the accompanying drawings, Figure 1 is a perspective view showing the improved spark-arrester applied to an ordinary smoke-stack. Fig. 2 is a sectional view showing the conical screen arranged within the smoke-stack.

Similar numerals of reference designate corresponding parts in both views.

Referring to the drawings, 1 designates an ordinary smoke-stack, which is shown to be of cylindrical form, although it will be understood as the description proceeds that the improved spark-arrester may be employed in connection with any form of smoke-stack or chimney. The spark-arrester consists, essentially, of a conical sieve or reticulated deflector 2, the lower or large end of which is of sufficient size to completely fill the upper end of the smoke-stack 1 or the portion of the smoke-stack adjacent to its upper end.

Connected to the upper contracted or small end of the sieve or deflector 2 is a tubular conductor or pipe 3, which after being joined to the sieve is given a semicircular bend, as indicated at 4, and returned downward alongside of and exterior to the smoke-stack 1, where its lower discharge end 5 enters the removable and perforated top 6 of a cup or receptacle 7, the upper portion of which is foraminous, as indicated at 8, and the lower end imperforate, so as to contain a supply of water in which the sparks are submerged and by means of which they are extinguished. The conical sieve 2 is preferably constructed from meshed-wire fabric, the meshes of which are small enough to prevent the escape of sparks large enough to travel a considerable distance before becoming extinguished. The larger sparks are thus caught within the deflector or sieve 2 and carried into and through the pipe 3 and into the water-receptacle 7, where they are submerged and extinguished.

Extending around the smoke-stack 1 at suitable points are bands or collars 9, which are extended, as indicated at 10, so as to embrace the pipe 3 and support and brace the same with relation to the smoke-stack. The upper band or collar 9 may also serve as a binder for holding the meshed-wire fabric of the sieve 2 upon the outer surface of the stack 1, where such fabric is disposed around the upper edge of the stack. The upper or smaller end of the deflector or sieve 2 is preferably placed around the contiguous end of the pipe 3 and is clamped thereto by means of a strap or binder 11, as shown, although the junction between said sieve and the pipe may be effected in any other convenient manner.

The water-receptacle 7 is provided with a bail 12, which extends upward and is adapted to be hooked over a spring clip or clasp 13, connected, preferably, to the lower band or collar 9, although of course said clip may be placed upon the pipe 3 itself. By this construction the water-receptacle may be detached from the stack and pipe 3 for the purpose of emptying the contents thereof and replenishing the supply of water therein. Instead of extending the sieve or deflector above the stack, as shown in Fig. 1, it may be placed entirely within the stack and below the upper end thereof, as shown in Fig. 2, in which case the stack itself will serve as an additional safeguard for preventing the spreading of the sparks which pass through the meshes of the sieve. The device is extremely simple in construction, effective in operation, and may be applied to any smoke-stack. By recurving the pipe 3 in the manner described and shown the force of the sparks ejected from the stack will be materially resisted, thus adding to the efficiency of the spark-arrester.

Having thus described the invention, what is claimed as new, and desired to be secured by Letters Patent, is—

In a spark-arrester, the combination with the smoke-stack, of a conical sieve, a deflector arranged at or near the top thereof, a pipe leading from the reduced end of said sieve downward along and in parallel relation to the stack, a metallic band extending around the stack adjacent to the discharge end of said pipe and having a portion which embraces the pipe for supporting the latter, and also provided with an upwardly-pointed hook, and a perforated water-receptacle having an opening in its upper end to receive the discharge end of said pipe, and also provided with a bail to be received upon the hook of the band, substantially as described.

In testimony whereof I have signed this specification in the presence of two subscribing witnesses.

JAMES W. TROUTT.

Witnesses:
 JIM MILLER,
 J. I. LONGACRE.